US011977873B2

(12) United States Patent
Fu et al.

(10) Patent No.: US 11,977,873 B2
(45) Date of Patent: May 7, 2024

(54) DEVICE MANAGEMENT TOOL

(71) Applicant: Zoom Video Communications, Inc., San Jose, CA (US)

(72) Inventors: Xiaolin Fu, Hefei (CN); Karen Kuei Ren Hong, San Jose, CA (US); Christopher Marinelarena, San Jose, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/175,984

(22) Filed: Feb. 15, 2021

(65) Prior Publication Data
US 2022/0244939 A1    Aug. 4, 2022

(30) Foreign Application Priority Data
Jan. 29, 2021  (CN) .......................... 202110129550.3

(51) Int. Cl.
*G06F 9/44* (2018.01)
*G06F 8/65* (2018.01)
*H04L 9/40* (2022.01)
*H04L 67/00* (2022.01)
*H04L 67/141* (2022.01)
*H04L 67/303* (2022.01)

(52) U.S. Cl.
CPC .............. *G06F 8/65* (2013.01); *H04L 63/166* (2013.01); *H04L 67/141* (2013.01); *H04L 67/303* (2013.01); *H04L 67/34* (2013.01)

(58) Field of Classification Search
CPC ........................................................ G06F 8/65
USPC ........................................................ 717/173
See application file for complete search history.

(56) References Cited

U.S. PATENT DOCUMENTS

| | | | | |
|---|---|---|---|---|
| 7,209,160 | B2* | 4/2007 | McNelley | G02B 30/56 348/14.09 |
| 7,376,944 | B2* | 5/2008 | Crisan | G06F 8/65 714/36 |
| 8,122,174 | B2* | 2/2012 | Knowles | H04L 67/02 709/219 |
| 8,125,894 | B2  | 2/2012 | Van Den Bosch et al. | |
| 8,346,229 | B2* | 1/2013 | Scott | H04M 1/72451 455/418 |

(Continued)

FOREIGN PATENT DOCUMENTS

| | | | | |
|---|---|---|---|---|
| CA | 2651075 C | * | 7/2015 | ............ E21B 41/00 |
| CN | 110175042 A | | 8/2019 | |
| WO | 2015013647 A1 | | 1/2015 | |

OTHER PUBLICATIONS

International Search Report and Written Opinion mailed in corresponding PCT application No. PCT/US2022/014287, dated May 6, 2022, 71 pages.

*Primary Examiner* — Evral E Bodden
(74) *Attorney, Agent, or Firm* — Young Basile Hanlon & MacFarlane, P.C.

(57) ABSTRACT

A method for use in a device management provisioning tool includes assigning a device to an account. The method includes determining whether the device requires a firmware upgrade. If the device requires a firmware upgrade, the method includes building an application package. The method includes transmitting the application package to the device to perform the firmware upgrade. The method includes connecting the device to a virtualized meeting software platform based on the firmware upgrade.

20 Claims, 10 Drawing Sheets

(56) References Cited

U.S. PATENT DOCUMENTS

| | | | | |
|---|---|---|---|---|
| 8,583,602 B2* | 11/2013 | Welingkar | .......... | H04L 67/1095 |
| | | | | 709/219 |
| 8,638,354 B2* | 1/2014 | Leow | ..................... | H04N 7/142 |
| | | | | 370/260 |
| 8,843,513 B1* | 9/2014 | Lew | ..................... | G06F 16/283 |
| | | | | 707/769 |
| 8,954,866 B2* | 2/2015 | Pignataro | ................ | H04L 51/04 |
| | | | | 715/758 |
| 9,332,424 B2* | 5/2016 | Logan | ................... | H04W 12/35 |
| 9,753,746 B2 | 9/2017 | Krzyzanowski et al. | | |
| 9,854,063 B2* | 12/2017 | Borzycki | ............ | G06F 21/6218 |
| 10,541,926 B2 | 1/2020 | Singh et al. | | |
| 11,206,372 B1* | 12/2021 | Zhang | ................. | H04L 12/1813 |
| 2010/0235517 A1* | 9/2010 | Augustinos | ......... | H04L 65/1069 |
| | | | | 709/227 |
| 2010/0325622 A1* | 12/2010 | Morton | ................... | G06F 8/654 |
| | | | | 717/168 |
| 2014/0068588 A1* | 3/2014 | Tan | ........................ | G06F 8/656 |
| | | | | 717/169 |
| 2015/0350424 A1* | 12/2015 | Mazard | ................... | H04M 3/58 |
| | | | | 455/552.1 |
| 2016/0226707 A1 | 8/2016 | Schallich et al. | | |
| 2018/0152509 A1* | 5/2018 | Kendall | ................... | H04L 67/02 |
| 2020/0213360 A1* | 7/2020 | Ojha | ...................... | H04W 40/34 |
| 2021/0225192 A1 | 7/2021 | Wells | | |

\* cited by examiner

DEVICE MANAGEMENT TOOL

CROSS REFERENCE TO RELATED APPLICATIONS

This application claims priority to and the benefit of Chinese Patent Application No. 202110129550.3, filed on Jan. 29, 2021, the contents of which are incorporated by reference herein in their entirety.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for a device management tool for configuring any device, such as a telephony device or a video device, to operate on a virtual meeting room platform.

One aspect of this disclosure is a method for use in a device management provisioning tool. The method may include assigning a device to an account. The method may include transmitting a command to a server to enroll the device. The device may be enrolled on a device management server associated with the device management provisioning tool. The method may include receiving a message from the device. The method may include determining whether the device requires a firmware upgrade. If the device requires a firmware upgrade, the method includes building an application package. The application package may be based on the message. The method includes transmitting the application package to the device to perform the firmware upgrade.

Another aspect of this disclosure includes a device management server. The device management server may include a device management provisioning tool that is configured to assign a device to an account. The device management provisioning tool may be configured to transmit a command to a server to enroll the device. The device management provisioning tool may be configured to receive a message from the device. The device management provisioning tool may be configured to determine whether the device requires a firmware upgrade. If the device requires a firmware upgrade, the device management provisioning tool may be configured to build an application package. The application package may be based on the message. The device management provisioning tool may be configured to transmit the application package to the device to perform the firmware upgrade.

Another aspect of this disclosure includes a method for use in a device management provisioning tool. The method may include assigning a device to an account. The method may include determining whether the device requires a firmware upgrade. If the device requires a firmware upgrade, the method may include building an application package. The method may include transmitting the application package to the device to perform the firmware upgrade. The method may include connecting the device to a virtualized meeting software platform based on the firmware upgrade.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Typical virtualized meeting software is designed to provide a shared space for users to conduct virtual meetings. The virtualized meeting software typically is not configured for telephony features, and therefore cannot support devices such as telephones (e.g., voice-over-internet protocol (VOIP) telephones), voice conference devices, and other appliances. Accordingly, typical virtualized meeting software does not allow for management of these types of devices.

Implementations of this disclosure address problems such as these by providing a device management tool that is configured to manage these types of devices while leveraging the current architecture. The device management tool may be configured to help a user manage devices that are room/meeting centric and/or telephone/meeting centric.

Figure 1:
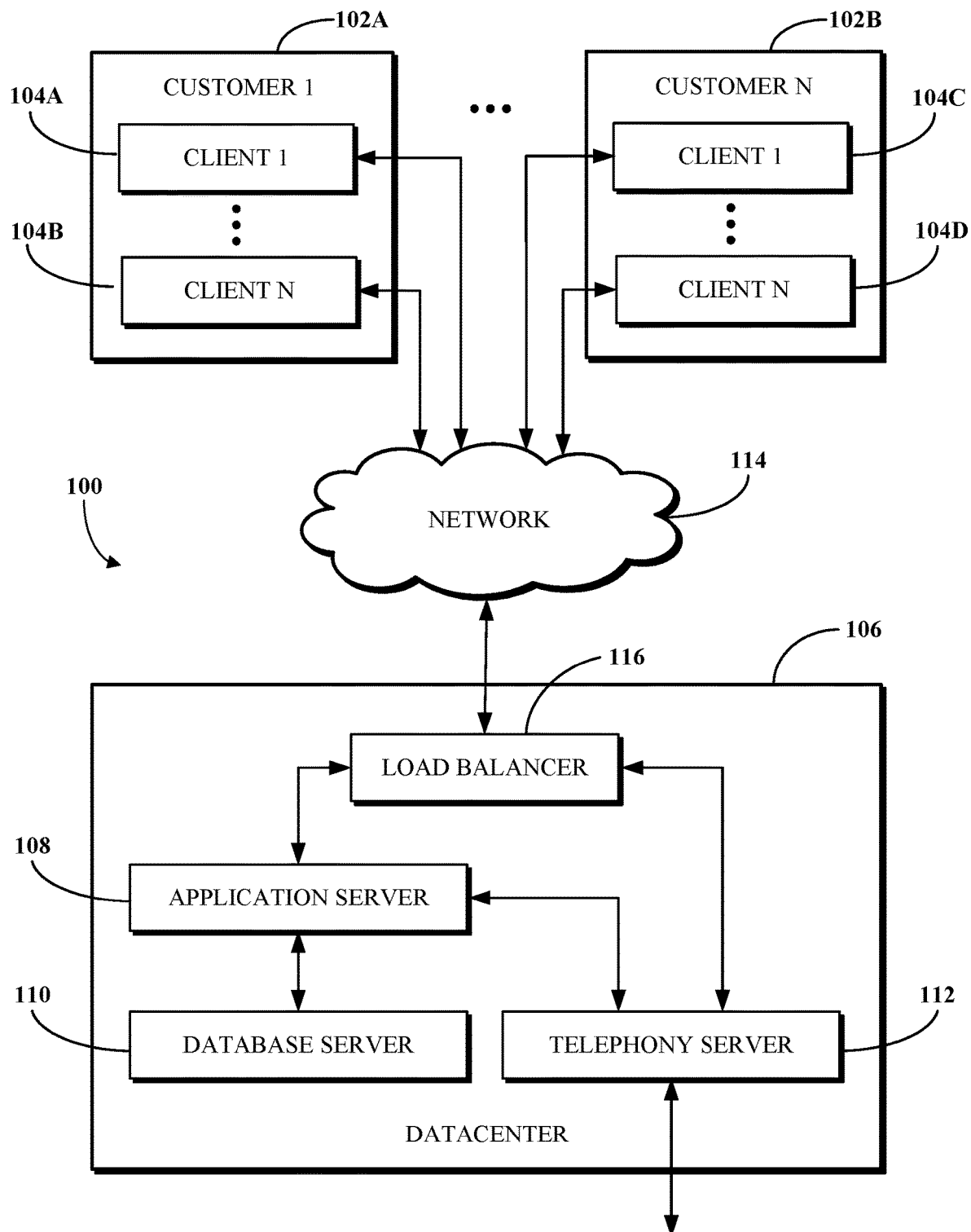
FIG. 1 is a block diagram of an example of an electronic computing and communications system.

To describe some implementations in greater detail, reference is first made to examples of hardware and software structures used to implement a device management tool. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an extensible markup language (XML) database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106.

Figure 2:
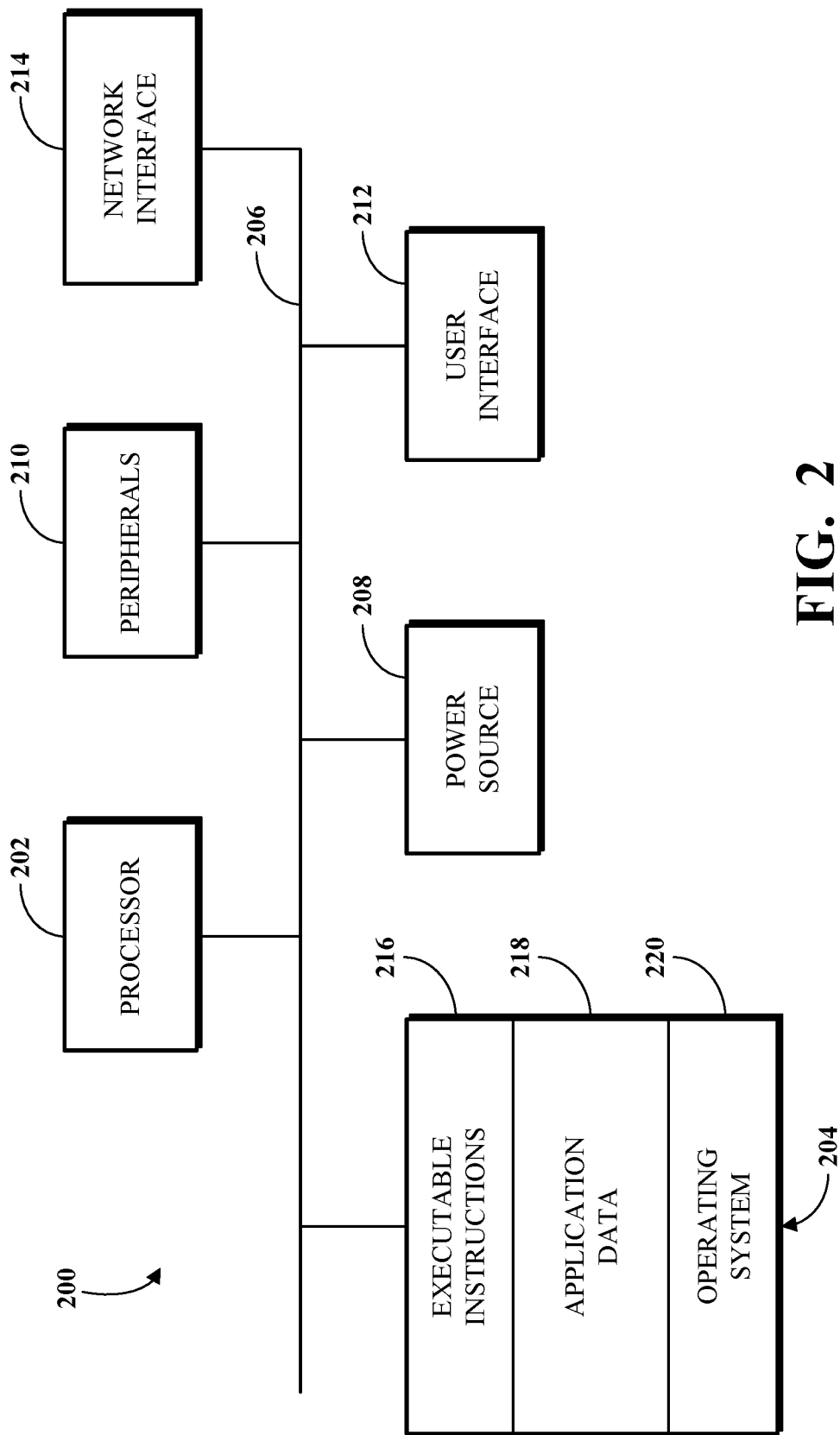
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a dynamic random access memory (DRAM) module, such as a double data rate (DDR) synchronous dynamic random access memory (SDRAM)) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an Institute of Electrical and Electronics Engineers (IEEE) 802.X protocol (e.g., wireless fidelity (Wi-Fi), Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
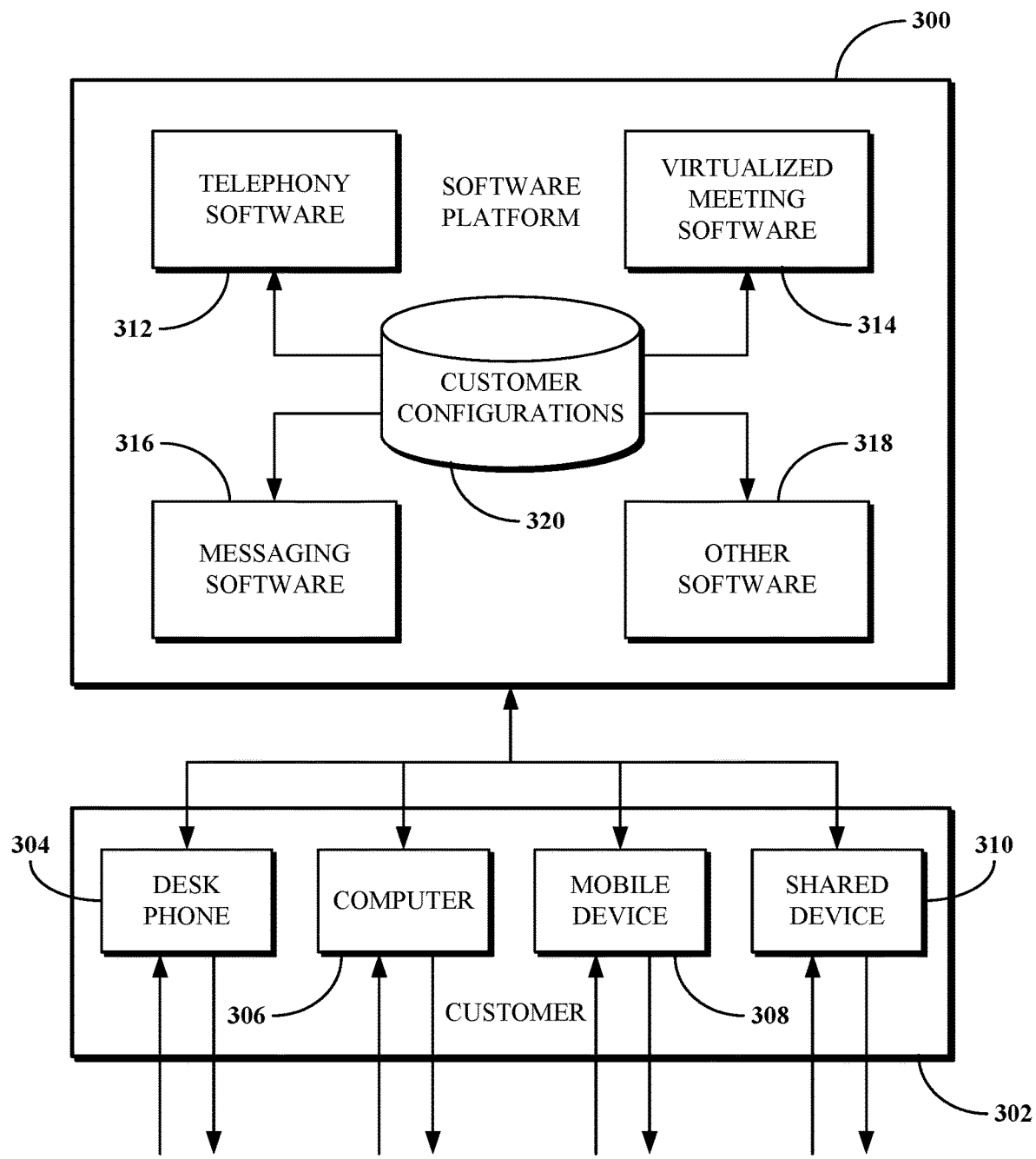
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, virtualized meeting software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. For example, the telephony software 312 may be implemented using one or more both of an application server and a telephony server, such as the application server 108 and the telephony server 112 shown in FIG. 1. Calls sent or received using the telephony software 312 may, for example, be sent or received using the desk phone 304, a softphone running on the computer 306, a mobile application running on the mobile device 308, or using the shared device 310 where same includes telephony features.

The virtualized meeting software 314 enables audio, video, and/or other forms of virtualized meetings between multiple devices, such as to facilitate a conference between the users of those devices. The virtualized meeting software 314 can include functionality for hosting, presenting scheduling, joining, or otherwise participating in a virtualized meeting. The virtualized meeting software 314 may further include functionality for recording some or all of a virtualized meeting and/or documenting a transcript for the virtualized meeting.

The messaging software 316 enables instant messaging, unified messaging, and other types of messaging communications between multiple devices, such as to facilitate a chat or like virtual conversation between users of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 may be used to configure a telephony device or a video device to operate on a virtual meeting room platform. The examples described herein refer to a telephony device for simplicity, and it is understood that the examples apply to any device and may include video devices.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a virtualized meeting. In yet another example, the virtualized meeting software 314 may include functionality for sending and receiving instant messages between participants and/or other users of the customer 302. In yet another example, the virtualized meeting software 314 may include functionality for file sharing between participants and/or other users of the customer 302. In some implementations, some or all of the software 312 through 318 may be combined into a single software application run on clients of the customer, such as one or more of the clients 304-310.

Figure 4:
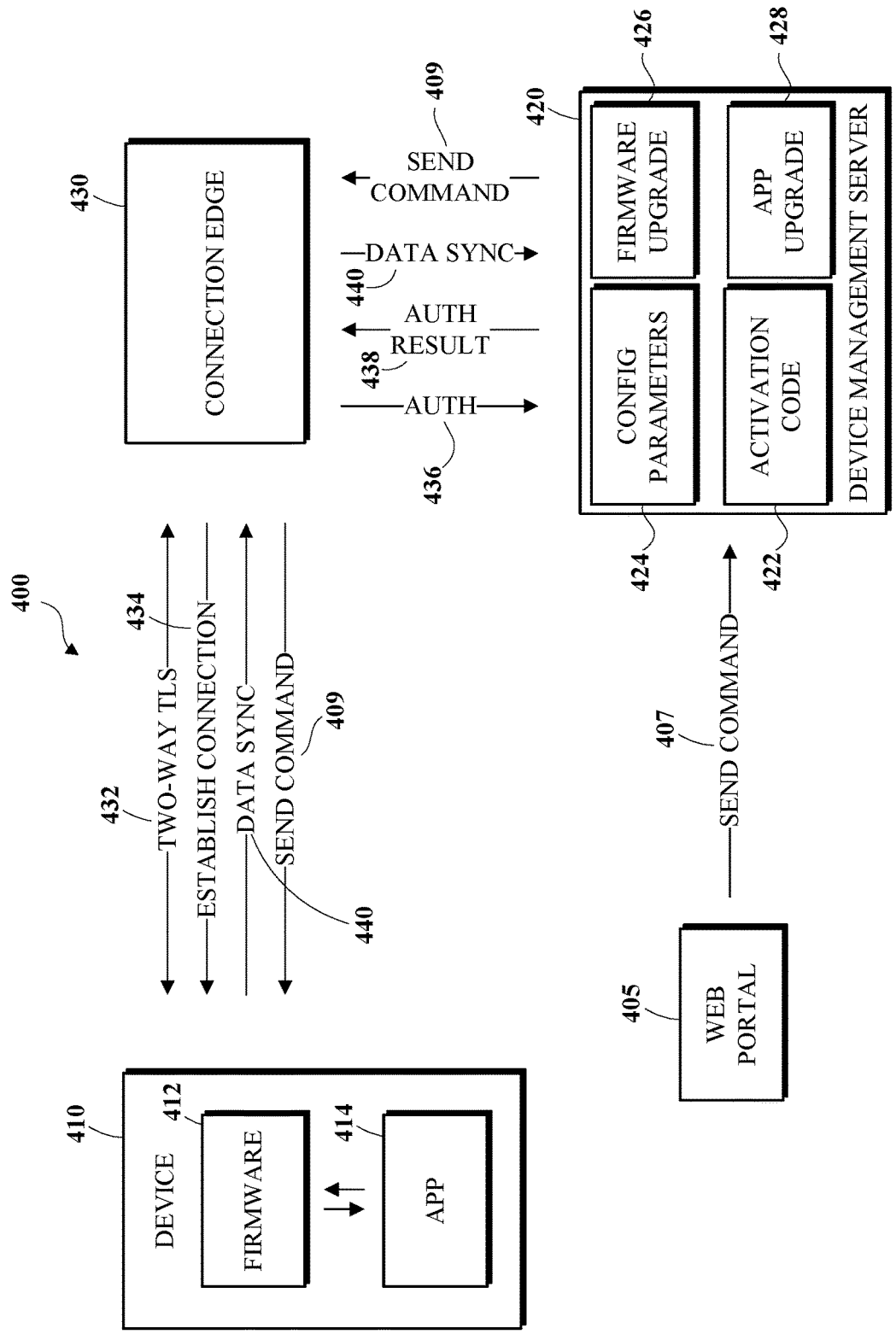
FIG. 4 is a block diagram of an example of a device management system.

FIG. 4 is a block diagram of an example of a device management system 400. The device management system 400 includes a web portal 405, a device 410, a device management server 420, and a connection edge (CE) server 430. The device management system 400 is shown with one device for simplicity and clarity, and it is understood that the device management system 400 may include multiple devices and multiple device types. The device management system 400 may use a message queueing telemetry transport (MQTT) protocol for instant bi-directional push of data between the device 410 and the CE server 430. The MQTT protocol may be based on a publish/subscribe (pub/sub) messaging architecture that reduces the total network traffic by eliminating the endless client polling. The device management server 420 may be used to upgrade an earlier firmware version on the device 410 that may not be compatible with the virtual meeting room platform.

The web portal 405 is an interface that may be accessed by a customer, for example, the customer 302 shown in FIG. 3, to perform a variety of functions. The web portal 405 may be accessed by the customer on a device, for example, a computer, a mobile device such as a smartphone or tablet, or another device that is configured to communicate via the internet. For example, the web portal 405 may be used to setup and configure the device 410 or upgrade the operating system (OS) of the device 410. The web portal 405 may be used to create a virtual meeting room or upgrade the virtual meeting room. The web portal 405 may be used to assign users to a virtual meeting room or to assign the device 410 to a user or a room (i.e., a location, such as a conference room in a building). The customer may use the web portal 405 to transmit a command 407 to the device management server 420. The command may include a hypertext transfer protocol (HTTP) request that includes a medium access control (MAC) address of the device 410.

The device 410 may include any device, for example the desk phone 304, computer 306, mobile device 308, or shared device 310 shown in FIG. 3. The device 410 may include a unique identification (ID). The unique ID may be a device serial number, a MAC address, or any other identifiable information. The device 410 may have a unique credential, such as a certificate or private key, to connect with the device management server 420. Requests between the device 410 and the device management server 420 may be secured using transport layer security (TLS). The unique credential may be issued by the vendor of the device 410. The unique credential may be bound to the unique ID of the device 410.

As shown in FIG. 4, the device 410 includes firmware 412 and an application 414. The firmware 412 may be stored on a non-volatile memory (not shown) and include executable instructions that are used to operate the device 410. The firmware 412 may be configured to communicate with the application 414. The application 414 may be an instance of software running on the device 410. The application 414 may be stored on a memory (not shown) and executed by a processor (not shown). In an example, the application 414 may include executable instructions for creating or running a virtual meeting room, or communicating with users in a virtual meeting room.

The device management server 420 may be part of a software platform, for example, the virtualized meeting software 314 shown in FIG. 3. The device management server 420 is configured to communicate with the web portal 405 and the CE server 430. The device management server 420 may be configured to perform a variety of functions based on the command 407 received from the web portal 405. For example, the device management server 420 may be configured to generate an activation code 422 to activate the device 410. The device management server 420 may be configured to set configuration parameters 424 to configure the device 410 to operate on a virtual meeting platform. The configuration parameters 424 may be referred to as a device profile and may include a feature ID, a feature level, a configuration value, or any combination thereof. The feature ID may be an indication of the feature to be configured. The feature level may indicate a room assignment for the device 410. The configuration value may indicate whether a particular configuration parameter is enabled. The device management server 420 may configure a firmware upgrade 426 to upgrade the firmware 412 of the device 410 to operate on a virtual meeting room platform, such as the software platform 300 shown in FIG. 3. The device management server 420 may configure an application upgrade 428 to upgrade the application 414 of the device 410 to operate on a virtual meeting platform. The device management server 420 may be configured to transmit a command 409 to the device 410 via the CE server 430 to activate the device 410, configure the device 410, upgrade the firmware 412, upgrade the application 414, or any combination thereof. The command 409 may be based on the command 407 received from the web portal 405. For example, the command 409 may be an activation command if the command 407 is a request to activate a device. In another example, the command 409 may be an upgrade command if the command 407 is a request to upgrade the firmware 412 or application 412. In another example, the command 409 may be a command to set or update a configuration parameter of the device 410 if the command 407 is a request to set or update a configuration parameter. The command 409 may include a device ID field, a command type field, a data field, a sensor field, a sample interval field, a report interval field, a report data field, or any combination thereof. The sample interval field may be an instruction to sample data at and indicated interval. The report interval field may indicate the interval for reports to be sent. The report data field may indicate the type of report.

The CE server 430 may be a customer enterprise system device. When the device 410 connects to the CE server 430 with a certificate, a mutual TLS authentication 432 is performed. The CE server 430 is configured to validate the certificate with the unique ID of the device 410 to establish a TLS connection 434. The CE server 430 may transmit an authentication request 436 to the device management server 420. The device management server 420 is configured to authenticate the device 410. The device 410 may be authenticated based on the unique ID, the unique credential, or both. The device management server 420 may transmit an authentication result 438 to the CE server 430 that indicates whether the authentication succeeded or failed.

The device 410 may synchronize data with the device management server 420 by transmitting data 440 to the CE server 430. Device information such as the firmware version, device ID, or the like may be synchronized. The CE server 430 may then forward the data 440 to the device management server 420.

Figure 5:
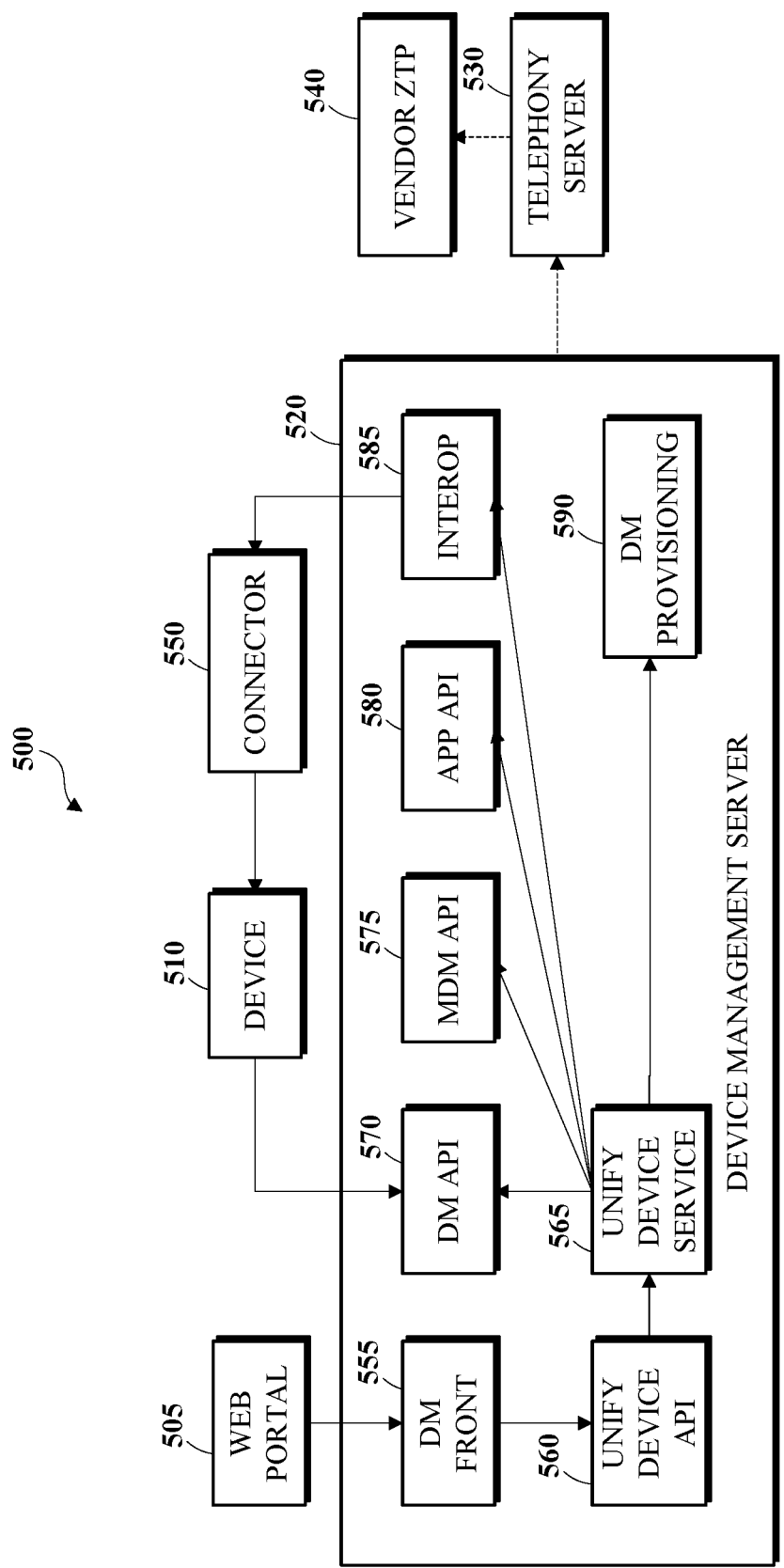
FIG. 5 is a block diagram of another example of a device management system.

FIG. 5 is a block diagram of another example of a device management system 500. The device management system 500 includes a web portal 505, a device 510, a device manager 520, an external telephony server 530, a vendor zero-touch provisioning (ZTP) tool 540, and a connector 550. The external telephony server 530 may be the telephony server 112 shown in FIG. 1. The device management system 500 is shown with one device for simplicity and clarity, and it is understood that the device management system 500 may include multiple devices and multiple device types. The device management system 500 may use an MQTT protocol for instant bi-directional push of data between the device 510 and the external telephony server 530. The MQTT protocol may be based on a publish/subscribe (pub/sub) messaging architecture that reduces the total network traffic by eliminating the endless client polling.

The web portal 505 is an interface that may be accessed by a customer, for example, the customer 302 shown in FIG. 3, to perform a variety of functions. The web portal 505 may be accessed by the customer on any device, for example, a computer, a mobile device such as a smartphone or tablet, or another device that is configured to communicate via the internet. For example, the web portal 505 may be used to setup and configure the device 510 or upgrade the OS of the device 510. The web portal 505 may be used to create a virtual meeting room or upgrade the virtual meeting room. The web portal 505 may be used to assign users to a virtual meeting room or to assign the device 510 to a user or a room (i.e., a location, such as a conference room in a building). The customer may use the web portal 505 to send a command to the device management server 520. The web portal 505 may be configured to transmit a hypertext transfer protocol (HTTP) request to the device management server 520.

The device 510 may include any device, for example the desk phone 304, computer 306, mobile device 308, or shared device 310 shown in FIG. 3. The device 510 may include a unique ID. The unique ID may be a device serial number, a MAC address, or any other identifiable information. The device 510 may have a unique credential, such as a certificate or private key, to connect with the device management server 520. Requests between the device 510 and the device management server 520 may be secured using TLS authentication. The unique credential may be issued by the vendor of the device 510. The unique credential may be bound to the unique ID of the device 510.

The device management server 520 may be part of a software platform, for example, the software platform 300 shown in FIG. 3. The device management server 520 is configured to communicate with the web portal 505 and the external telephony server 530. The external telephony server 530 may be a management server of the device manufacturer. The device management server 520 may be configured to perform a variety of functions based on the command received from the web portal 505. For example, the device management server 520 may be configured to generate an activation code to activate the device 510. The device management server 520 may be configured to set configuration parameters to configure the device 510. The device management server 520 may configure a firmware upgrade to upgrade the firmware of the device 510. The device management server 520 may configure an application upgrade to upgrade the application of the device 510. The device management server 520 may be configured to transmit a command to the device 510 via the connector 550 to activate the device 510, configure the device 510, upgrade the firmware, upgrade the application, or any combination thereof. The command may be based on the command received from the web portal 505.

As shown in FIG. 5, the device management server 520 includes a device manager front end 555, a unify device API 560, and a unify device service 565. The device management server 520 includes one or more subsystem components, such as a device manager API 570, a manufacturer device management (MDM) API 575, an application API 580, an interoperability provisioning tool 585, and a device management provisioning tool 590. The device manager front end 555 is configured to receive the HTTP request from the web portal 505 and forward the HTTP request to the unify device API 560. The HTTP request may include some metadata, for example, a unified action type, a unified identification (ID), a unified ID set, a filter, one or more parameters, a device MAC address in an extensible field header that indicates the type of device that can be processed by the unify device API 560, or any combination thereof.

The unify device API 560 may be configured to support multiple device types and multiple protocols for different devices to provide a uniform customer experience. The unify device API 560 may query a mapping table to obtain corresponding subsystem information to generate a unified context to map the various protocols and devices. The unify device API 560 generates a command based on the unified context and transmits the command to the unify device service 565. The command may include one or more fields such as a unified action information field, a subsystem ID set field, a subsystem type field, or any combination thereof. The unified action information field may indicate one or more actions for the device 510 to perform, for example to activate the device, configure the device, upgrade the firmware, upgrade the application, or any combination thereof.

The unify device service 565 is configured to build the subsystem action information and generate a command that includes the subsystem action information. The subsystem action information may include one or more fields such as a subsystem queue type field, a subsystem action type field, a subsystem ID field, a subsystem ID set field, one or more parameter fields, or any combination thereof. The unify device service 565 is configured to transmit the command to one or more subsystem components, such as the device manager API 570, MDM API 575, application API 580, interoperability provisioning tool 585, device management provisioning tool 590, or any combination thereof, based on a subsystem type indicated in the command. The unified device service 565 is configured to maintain data from any device connected to the device management server 520 in a uniform format to provide seamless reporting and device management features audit log, request authorize, and the like.

In some examples, the device manager API 570 may be installed on the device 510. The device manager API may be configured to communicate with the device 510 using an MQTT protocol. The unify device service 565 may transmit the command to the device manager API 570 when the device type indicates that the device 510 is a registered device (e.g., registered with the software platform). The unify device service 565 may transmit the command to the MDM API 575 when the device type indicates that the device 510 is configured with a particular manufacturer OS, for example an Apple OS or a Windows OS. The unify device service 565 may transmit the command to the application API 580 when the device type indicates that the device 510 is an unregistered device. The unify device service 565 may transmit the command to the interoperability provisioning tool 585 when the device type indicates that the device 510 is an existing device that has been provisioned and is supported. The unify device service 565 may transmit the command to the device management provisioning tool 590 when the device type indicates that the device 510 is an older device. The device management provisioning tool 590 may be used to provide backwards compatibility for older devices. The device management provisioning tool 590 may be used by the device 510 to communicate with a management server of the device manufacturer.

The device management server 520 is configured to build an application package for an device that has telephony features, such as device 510, to configure the device to operate on a virtual meeting room platform. The device management server 520 is configured to obtain configuration information for the device 510 from the vendor ZTP tool 540 via the external telephony server 530. The device management server 520 is configured to update the configuration information to redirect communication between the device 510 and the external telephony server 530 such that the device 510 is configured to communicate with the device management server 520. The interoperability provisioning tool 585 is configured to update the configuration parameters (i.e., device profile) of the device 510 via the connector 550. When the configuration of the device 510 is updated, the device 510 is then configured to communicate with the device management server 520 on the virtual meeting platform.

Figure 6:
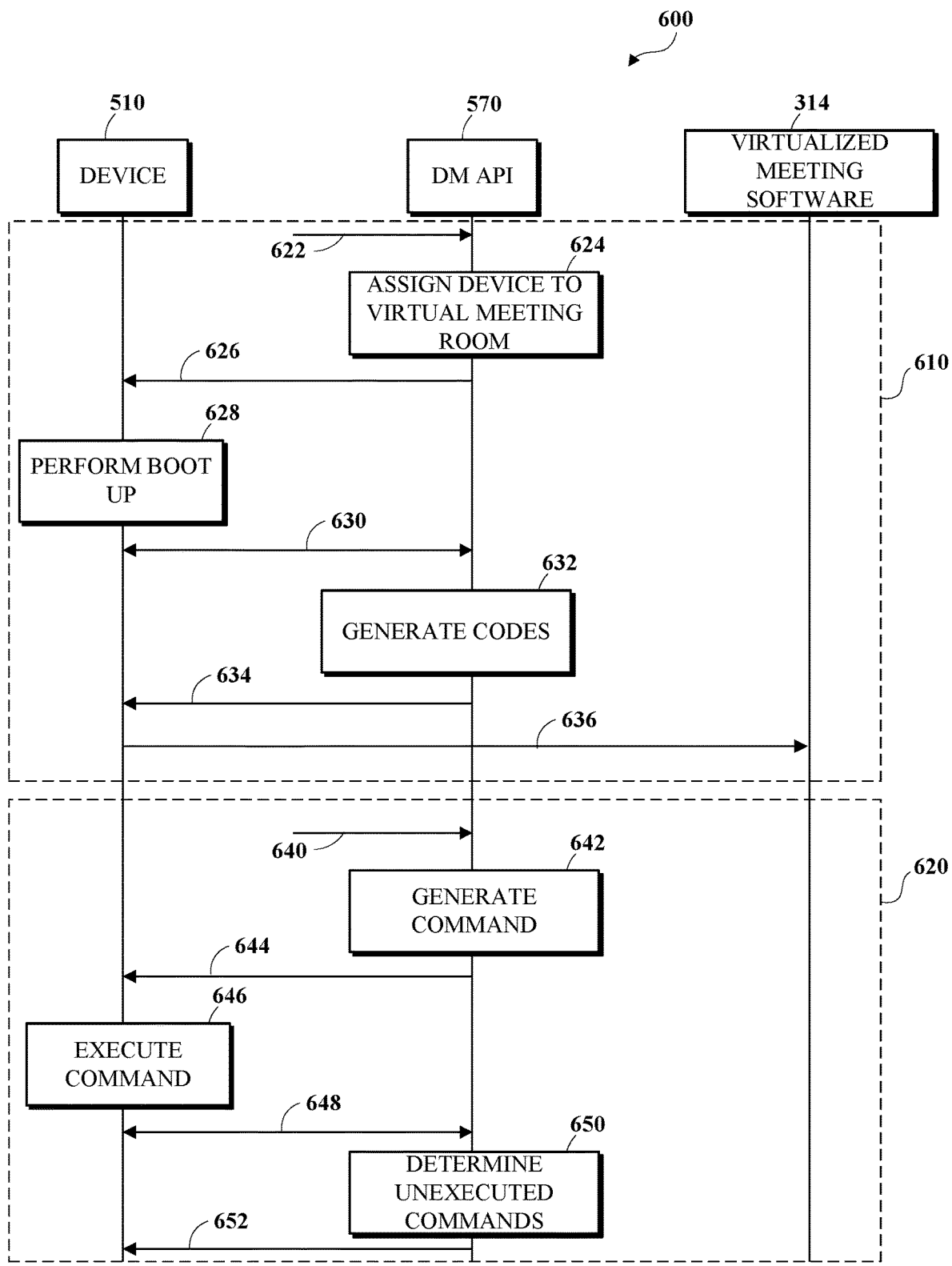
FIG. 6 is a flow diagram of an example of an implementation of a device manager application programming interface (API), for example the device manager API shown in FIG. 5.

FIG. 6 is a flow diagram of an example of an implementation 600 of a device manager API, for example the device manager API 570 shown in FIG. 5. As shown in FIG. 6, the implementation 600 includes a device, such as device 510 shown in FIG. 5, a device manager API, such as device manager API shown in FIG. 5, and virtualized meeting software, such as virtualized meeting software 314 shown in FIG. 3. FIG. 6 shows two phases where a first phase 610 may be an example of an automatic sign-in phase and the second phase 620 may be an example of a command life cycle phase.

As shown in FIG. 6, in the first phase 610, the device manager API 570 is configured to receive 622 a request to assign 624 the device 510 to a virtual meeting room. The request may be from a customer and may be received via a web portal, such as web portal 405 shown in FIG. 4. Assigning 624 the device to a virtual meeting room may include generating an activation command. The device manager API 570 may transmit 626 the activation command 626 to the device 510.

The device 510 may receive the activation command and in response thereto perform 628 a boot up procedure. The boot up procedure may include performing a two-way TLS authentication 630. Upon completing the two-way TLS authentication 630, the device manager API 570 may generate 632 one or more codes. For example, the device manager API 570 may generate a room code, an activation code, or both. The device manager API 570 may encode a command 634 with the one or more generated codes and transmit the command 634 to the device 510. The device 510 is configured to receive the command 634 and transmit 636 the one or more generated codes, for example the activation code, to the virtualized meeting software 314 to perform the automatic sign-in.

In the second phase 620, the device manager API 570 is configured to receive 640 a request. The request may be from a customer and may be received via a web portal, such as web portal 405 shown in FIG. 4. The request 640 may include an instruction to perform an action on the device 510.

The device manager API 570 is configured to receive the request 640 and generate 642 a command 644. The command 644 may be generated from data obtained from a database. The device manager API 570 is configured to transmit the command 644 to the device 510. The command 644 may be a push command.

The device 510 is configured to receive and execute 646 the command 644. The device 510 and the device manager API 570 may perform a two-way TLS authentication 648. The device may send a result of the executed command to the device manager API 570. The device manager API 570 is configured to determine 650 whether there are any unexecuted commands that need to be executed. If the device manager API 570 determines that there are unexecuted commands that need to be executed, the device manager API 570 may generate one or more commands and transmit 652 the one or more commands to the device 510. If the device manager API 570 determines that there are no unexecuted commands that need to be executed, the device manager API 570 may transmit an empty or null message to the device 510.

Figure 7:
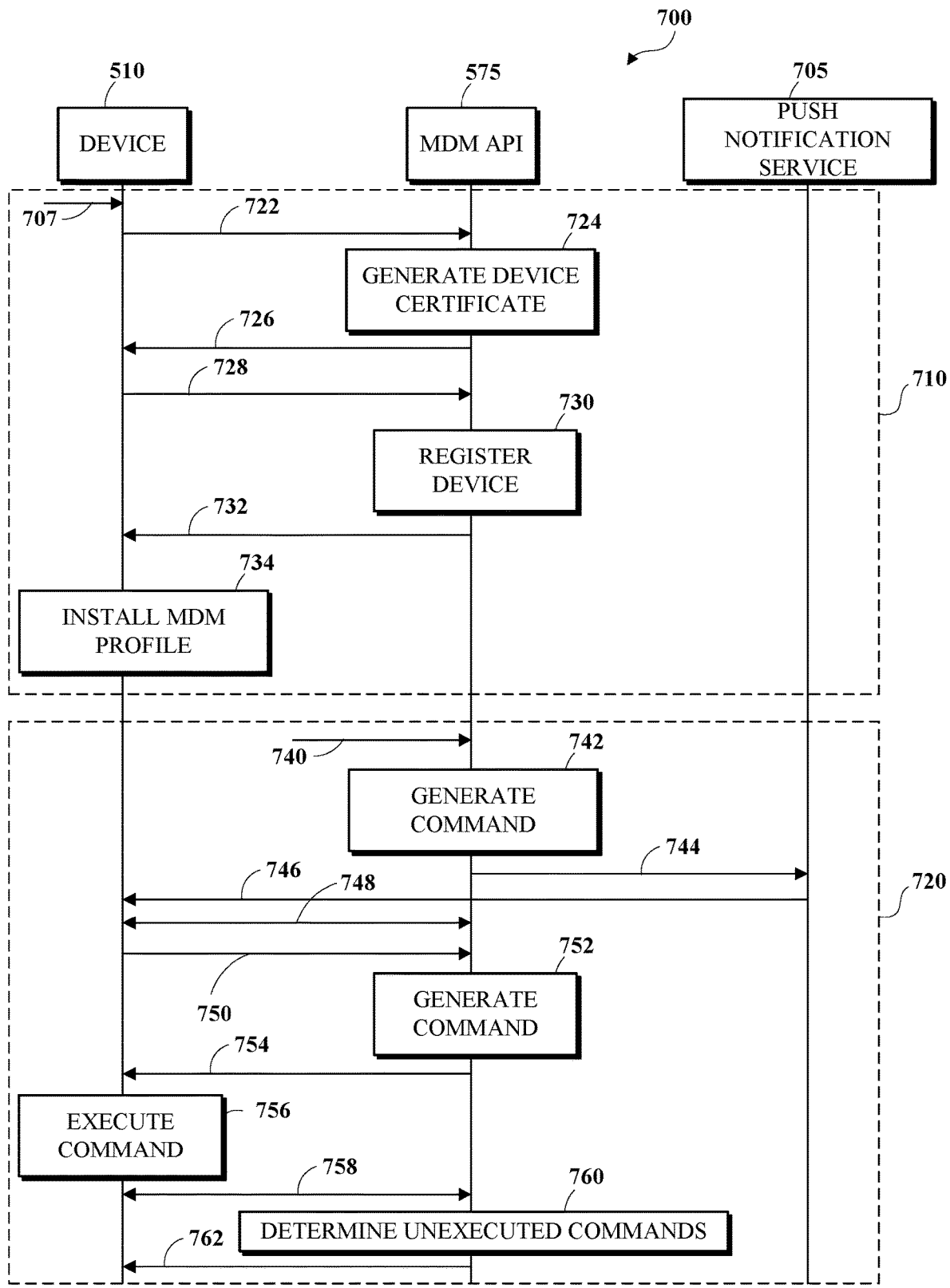
FIG. 7 is a flow diagram of an example of an implementation of a manufacturer device management (MDM) API, for example the MDM API shown in FIG. 5.

FIG. 7 is a flow diagram of an example of an implementation 700 of an MDM API, for example the MDM API 575 shown in FIG. 5. As shown in FIG. 7, the implementation 700 includes a device, such as device 510 shown in FIG. 5, an MDM API, such as MDM API 575 shown in FIG. 5, and a push notification service 705. The push notification service 705 may be any push notification service, for example an Apple push notification service (APNS) or a Windows push notification service (WPS). FIG. 7 shows two phases where a first phase 710 may be an example of an enrollment phase and the second phase 720 may be an example of a command life cycle phase.

In the first phase 710, the device 510 may be configured to scan a quick response (QR) code or receive an input 707 that includes an access code. The device 510 is configured to generate a request 722 based on the QR code or the access code. The request 722 may include a request for a device identity certificate. The device 510 is configured to transmit the request 722 to the MDM API 575. The MDM API 575 is configured to receive the request 722 and perform simple certificate enrollment protocol (SCEP) to generate 724 a device identity certificate. The device identity certificate may be encoded in a command 726 The MDM API 575 is configured to transmit the command 726 to the device 510.

The device 510 is configured to receive the command 726 and transmit a device check in request 728 to the MDM API 575. The MDM API 575 is configured to receive the device check in request 728 and perform a check in procedure to register 730 the device 510. The check in procedure may include generating a message 732 that includes an MDM profile. The MDM API 575 is configured to transmit the message 732 to the device 510. The device 510 is configured to receive the message 732 and install 734 the MDM profile to allow the device 510 to connect to the device management server 520 shown in FIG. 5.

In the second phase 720, the MDM API 575 may receive a request 740. The request 740 may be from a customer and may be received via a web portal, such as web portal 405 shown in FIG. 4. The request 740 may include an instruction to perform an action on the device 510.

The MDM API 575 is configured to receive the request 740 and generate 742 a command 744. The command 744 may be generated from data obtained from a database. The MDM API 575 is configured to transmit the command 744 to the push notification service 710. The push notification service 710 may generate a push notification 746 and transmit the push notification 746 to the device 510.

The device 510 is configured to receive the push notification 746 and perform a two-way TLS authentication 748 with the MDM API 575. The device 510 is configured to transmit an IDLE request 750 to the MDM API 575. The MDM API 575 is configured to receive the IDLE request 750 and generate 752 a command 754. The MDM API 575 is configured to transmit the command 754 to the device 510. The device 510 is configured to execute 756 the command and perform a two-way TLS authentication 758 with the MDM API 575. The device may send a result of the executed command to the MDM API 575. The MDM API 575 is configured to determine 760 whether there are any unexecuted commands that need to be executed. If the MDM API 575 determines that there are unexecuted commands that need to be executed, the MDM API 575 may generate one or more commands 762 and transmit the one or more commands 762 to the device 510. If the MDM API 575 determines that there are no unexecuted commands that need to be executed, the MDM API 575 may transmit an empty or null message to the device 510.

Figure 8:
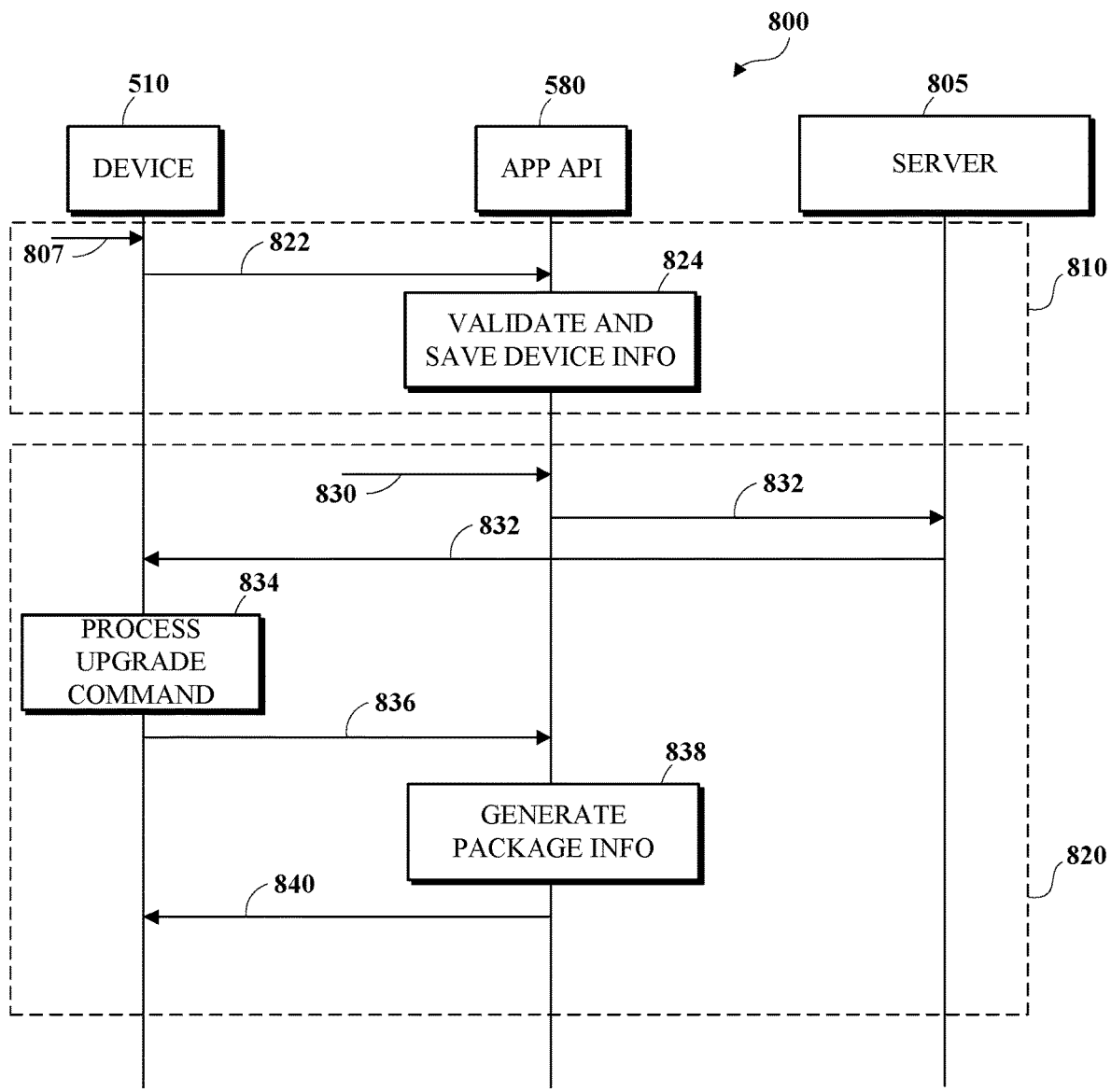
FIG. 8 is a flow diagram of an example of an implementation of an application API, for example the application API shown in FIG. 5.

FIG. 8 is a flow diagram of an example of an implementation 800 of an application API, for example the application API 580 shown in FIG. 5. As shown in FIG. 8, the implementation 800 includes a device, such as device 510 shown in FIG. 5, an application API, such as application API 580 shown in FIG. 5, and a server 805. The server 805 may be a server on which a software platform resides, for example, the software platform 300 shown in FIG. 3. The server 805 may be configured to communicate using an extensible messaging and presence protocol (XMPP). FIG. 8 shows two phases where a first phase 810 may be an example of a login phase and the second phase 820 may be an example of an upgrade phase.

In the first phase 810, the device 510 may be configured to receive an input 807. The input 807 may include login credentials and may be received via a web portal, such as web portal 405 shown in FIG. 4. The device 510 is configured to generate a login request 822 based on the input 807. The login request 822 may include the login credentials, the device information of device 510, or both. The device 510 is configured to transmit the login request 822 to the application API 580. The application API 580 is configured to receive the request 822 and validate and save 824 the device information.

In the second phase 820, the application API 580 may receive a request 830. The request 830 may be a request to upgrade the firmware of the device 510 or to upgrade an application on the device 510. The request 830 may be received via a web portal, such as web portal 405 shown in FIG. 4. The application API 580 is configured to generate an upgrade command 832 and transmit the upgrade command 832 to the server 805. The server 805 is configured to forward the upgrade command 832 to the device 510. The device 510 is configured to receive the upgrade command 832. The device 510 is configured to process 834 the upgrade command 832 and transmit an upgrade request 836 to the application API 580. The application API 580 is configured to receive the upgrade request 836 and generate 838 package information (i.e., and application package) for an upgrade based on the upgrade request 836. The package information may include a download URL. The application API 580 is configured to transmit the application package in a message 840 to the device 510. The device 510 is configured to receive the message 840 and perform the upgrade.

Figure 9:
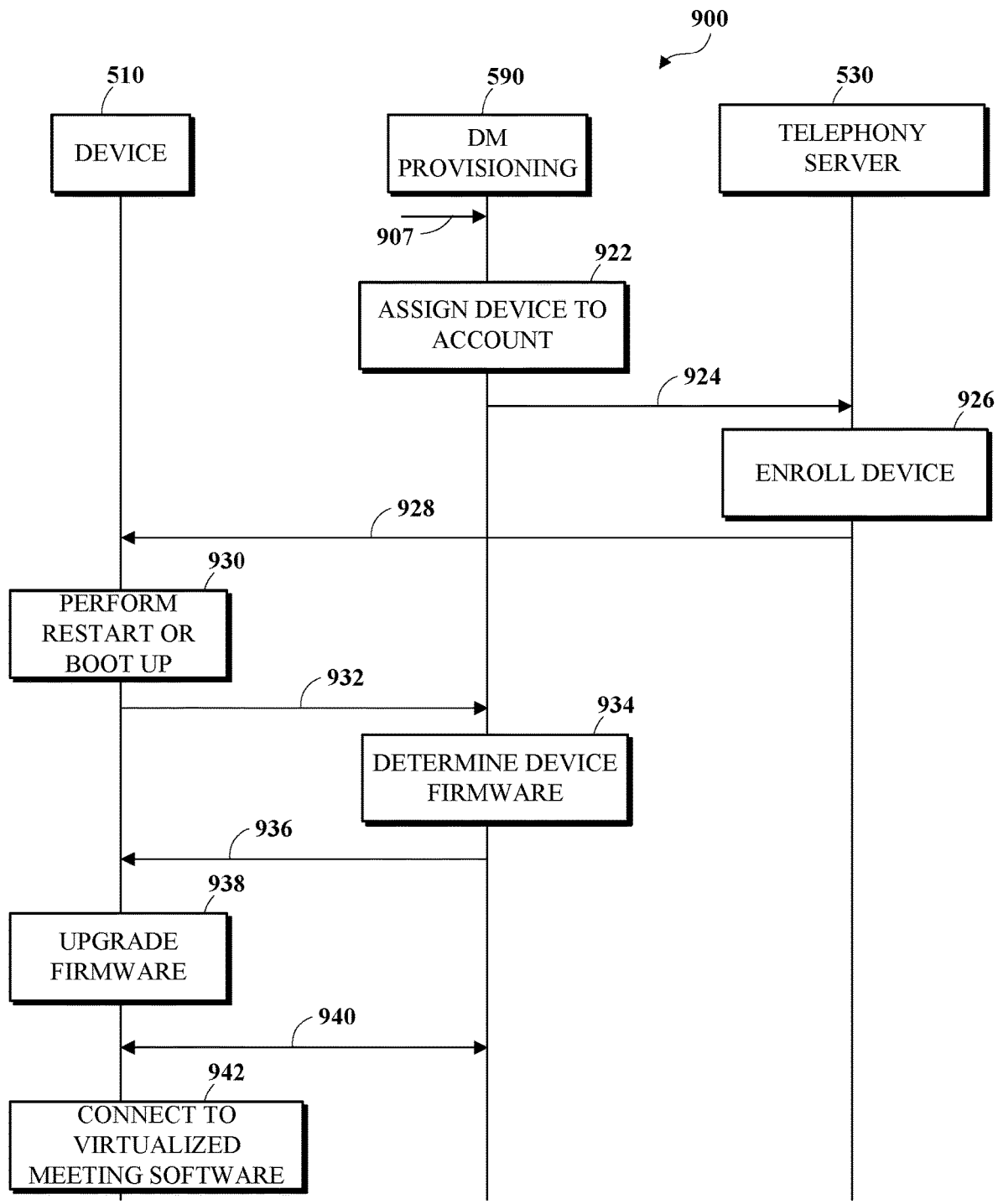
FIG. 9 is a flow diagram of an example of an implementation of a device management provisioning tool, for example the device management provisioning tool shown in FIG. 5.

FIG. 9 is a flow diagram of an example of an implementation 900 of a device management provisioning tool, for example the device management provisioning tool 590 shown in FIG. 5. The implementation 900 is an automatic provisioning example. As shown in FIG. 9, the implementation 900 includes a device, such as device 510 shown in FIG. 5, a device management provisioning tool, such as device management provisioning tool 590 shown in FIG. 5, and a telephony server, such as external telephony server 530 shown in FIG. 5. The telephony server 530 may be an external server that is associated with the manufacturer of the device 510.

As shown in FIG. 9, the device management provisioning tool 590 is configured to receive a request 907. The request 907 may include an instruction to add or import a desk phone and may be received via a web portal, such as web portal 405 shown in FIG. 4. The device management provisioning tool 590 is configured to receive the request 907 and assign 922 the device 510 to an account. The device management provisioning tool 590 is configured to transmit a command 924 to the telephony server 530. The command 924 may include a unique ID of the device 510, such as a device serial number, a MAC address, or any other identifiable information. The command 924 may include a certificate, account information, a device type, a command type, or any combination thereof. The telephony server 530 is configured to receive the command 924 and enroll 926 the device 510 to the telephony server 530.

Upon enrollment of the device 510, the telephony server 530 is configured to transmit a message 928 to the device 510. The device 510 is configured to receive the message 928 and perform 930 a restart or boot up. The device 510 is configured to transmit a message 932 to establish a connection to the device management provisioning tool 590. The message 932 may include device information such as a device model number, a device serial number, a device MAC address, a firmware version, an application version, a message type, or any combination thereof. The device management provisioning tool 590 is configured to receive the message 932 and determine 934 whether a firmware upgrade is needed. If the device management provisioning tool 590 determines that a firmware upgrade is needed, the device management provisioning tool 590 builds an application package based on the message 932 to upgrade the firmware of the device 510. The device management provisioning tool 590 transmits a message 936 to the device 510 that includes the application package.

The device 510 is configured to receive the message 936 that includes the application package and upgrade 938 the firmware using the application package. Based on the firmware upgrade, the device 510 is configured to perform a two-way TLS authentication 940 and connect 942 to a virtualized meeting software, such as the virtualized meeting software 314 shown in FIG. 3.

Figure 10:
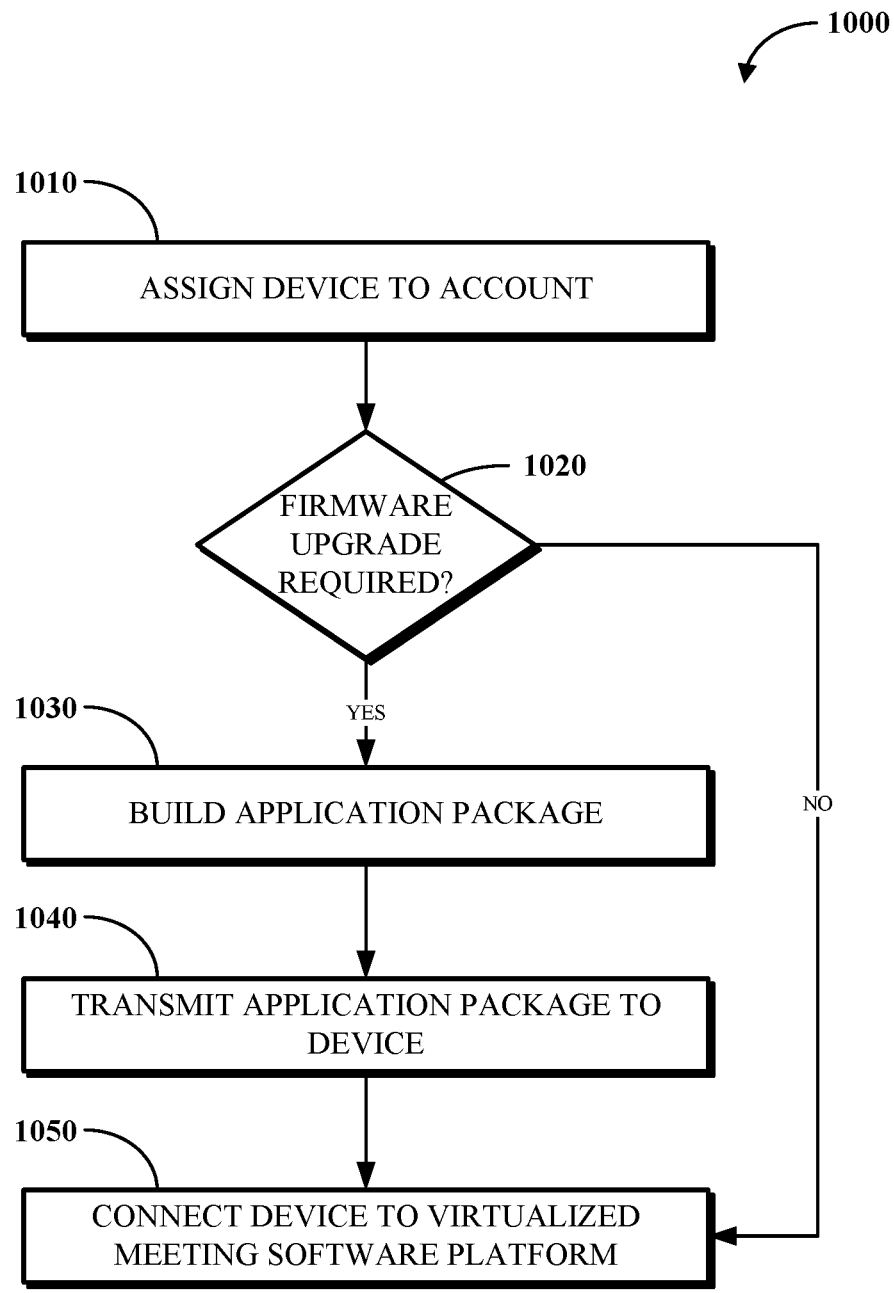
FIG. 10 is a flow diagram of an example of a method of use for a device management provisioning tool.

FIG. 10 is a flow diagram of an example of a method 1000 of use for a device management provisioning tool. The method 1000 includes assigning 1010 a device to an account. The device may be any device such as a telephony device or a video device that can operate on a virtualized meeting software platform, such as virtualized meeting software 314 shown in FIG. 3.

As shown in FIG. 10, the method 1000 includes determining 1020 whether the device requires a firmware upgrade. If the device requires a firmware upgrade, the method includes building 1030 an application package. The application package may be built based on one or more of a device model number, a device serial number, or a firmware version. The method 1000 includes transmitting 1040 the application package to the device to perform the firmware upgrade. The method 1000 includes connecting 1050 the device to the virtualized meeting software platform based on the firmware upgrade. If it is determined 1020 that the device does not require a firmware upgrade, the method 500 includes connecting 1050 the device to the virtualized meeting software platform.

The method 1000 can be executed using computing devices, such as the systems, hardware, and software described with respect to FIGS. 1-9. The method 1000 can be performed, for example, by executing a machine-readable program or other computer-executable instructions, such as routines, instructions, programs, or other code. The steps, or operations, of the method 1000 or another technique, method, process, or algorithm described in connection with the other implementations disclosed herein can be implemented directly in hardware, firmware, software executed by hardware, circuitry, or a combination thereof.

For simplicity of explanation, the method 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an application specific integrated circuit (ASIC)), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method of use for a device management provisioning tool, the method comprising:
   performing, by the device management provisioning tool executing on a first device management server of a virtual meeting platform, a process to configure a device that is configured to operate on a second device management server to operate on the virtual meeting platform, wherein performing the process comprises:
   assigning the device to a location within a building;
   transmitting a command to the second device management server to enroll the device on the first device management server of the virtual meeting platform, wherein the second device management server is an external server of a manufacturer of the device;
   receiving a message from the device responsive to a boot up of the device;
   determining, based on the message, that the device comprises firmware that is incompatible with the virtual meeting platform and requires a firmware upgrade;
   building an application package, based on the message, to configure the device such that communication between the device and the second device management server is redirected between the device and the virtual meeting platform; and
   transmitting the application package to the device to perform the firmware upgrade.

2. The method of claim 1 further comprising:
   receiving a request via a web portal, wherein assigning the device to the location within the building is based on the request.

3. The method of claim 1, further comprising:
   receiving a request via a web portal, wherein assigning the device to the location within the building is based on the request and the request includes an instruction to add or import a desk phone.

4. The method of claim 1 further comprising:
   performing a two-way transport layer security (TLS) authentication with the device; and
   establishing a connection between the device and the virtual meeting platform based on the firmware upgrade.

5. The method of claim 1, wherein the firmware upgrade configures the device to connect to the first device management server.

6. The method of claim 1, wherein the second device management server is a telephony server.

7. The method of claim 1, wherein the command includes a unique identification (ID) of the device.

8. The method of claim 1, wherein the command includes a unique identification (ID) of the device and the unique ID includes at least one of a device serial number or a medium access control (MAC) address of the device.

9. The method of claim 1, wherein the command includes a device type.

10. The method of claim 1, wherein the message includes a firmware version.

11. A device management server comprising:
    a device management provisioning tool executing on a processor of a virtual meeting platform, the device management provisioning tool configured to perform a process to configure a device that is configured to operate on a second device management server to operate on the virtual meeting platform, the device management provisioning tool configured to:
    assign the device to a location within a building;
    transmit a command to the second device management server to enroll the device on the device management server of the virtual meeting platform, wherein the second device management server is an external server of a manufacturer of the device;
    receive a message from the device responsive to a boot up of the device;
    determine, based on the message, that the device comprises firmware that is incompatible with the virtual meeting platform and requires a firmware upgrade;
    build an application package, based on the message, to configure the device such that communication between the device and the second device management server is redirected between the device and the virtual meeting platform; and
    transmit the application package to the device to perform the firmware upgrade.

12. The device management server of claim 11 further comprising:
    a front end configured to receive a request via a web portal, wherein the assignment of the device to the location within the building is based on the request.

13. The device management server of claim 11, wherein the device management provisioning tool is further configured to:

perform a two-way transport layer security (TLS) authentication with the device; and establish a connection between the device and the virtual meeting platform based on the firmware upgrade.

14. The device management server of claim 11, wherein the command includes a unique identification (ID) of the device.

15. The device management server of claim 11, wherein the command includes a unique identification (ID) of the device and the unique ID includes at least one of a device serial number or a medium access control (MAC) address of the device.

16. The device management server of claim 11, wherein the command includes a command type.

17. The device management server of claim 11, wherein the message includes an application version.

18. A non-transitory computer-readable medium comprising stored instructions that, when executed by a processor of a first device management server of a virtual meeting platform, cause the processor to perform a process to configure a device that is configured to operate on a second device management server to operate on the virtual meeting platform, wherein performing the automated process comprises:

assigning the device to a location within a building;

transmitting a command to the second device management server to enroll the device on the first device management server of the virtual meeting platform, wherein the second device management server is an external server of a manufacturer of the device;

receiving a message from the device responsive to a boot up of the device;

determining, based on the message, that the device comprises firmware that is incompatible with the virtual meeting platform and requires a firmware upgrade;

building an application package, based on the message, to configure the device such that communication between the device and the second device management server is redirected between the device and the virtual meeting platform; and transmitting the application package to the device to perform the firmware upgrade.

19. The non-transitory computer-readable medium of claim 18, wherein performing the process further comprises:

performing a two-way transport layer security (TLS) authentication with the device.

20. The non-transitory computer-readable medium of claim 18, wherein the application package is built based on one or more of a device model number, a device serial number, or a firmware version.

* * * * *